Jan. 3, 1933. J. H. BANINGER 1,893,219
BEARING MOUNTING
Filed May 20, 1930
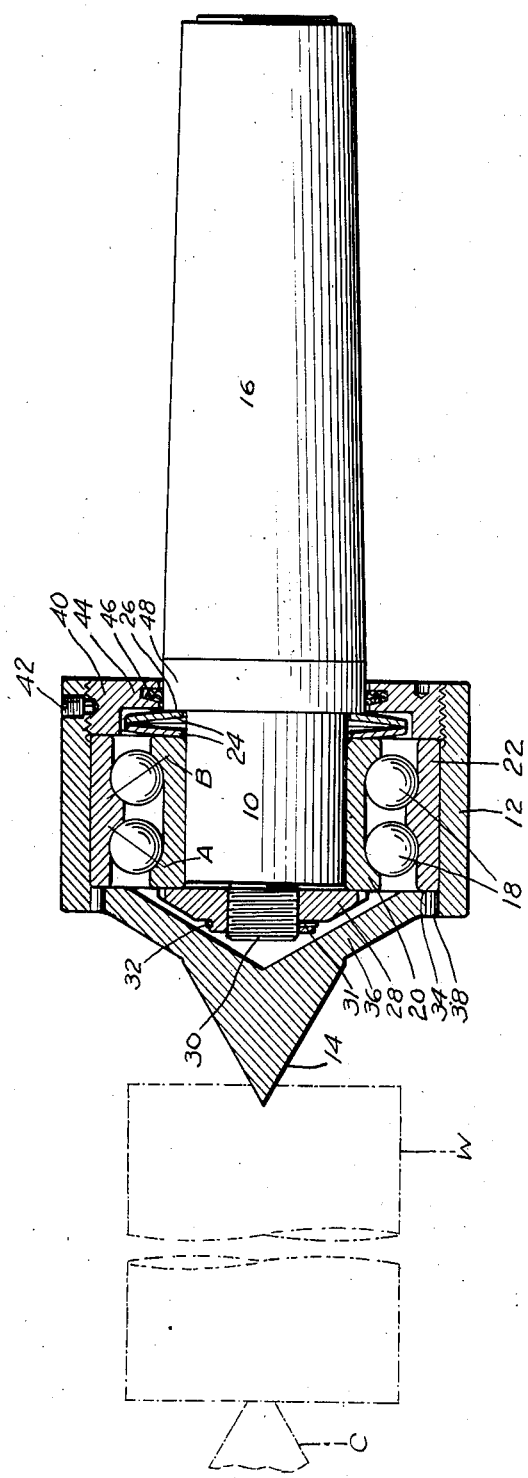
INVENTOR:
JOHN H. BANINGER,
BY [signature]
HIS ATTORNEY.

Patented Jan. 3, 1933

1,893,219

UNITED STATES PATENT OFFICE

JOHN H. BANINGER, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

BEARING MOUNTING

Application filed May 20, 1930. Serial No. 453,924.

This invention relates to bearing mountings, being especially applicable to lathe centers, and comprises all the features of novelty herein disclosed.

An object of the invention is to provide an improved mounting for lathe centers and the like. Another object is to provide improved means to protect the bearings of a rotary lathe center from excessive end thrust while maintaining true running alignment of the center under all conditions. Another object is to provide a simple, compact and durable lathe center mounting which will compensate for work expansion and maintain accurate and firm support.

To these ends and to improve generally and in detatil upon devices of this character, the invention further consists in the various matters hereinafter described and claimed. In its broader aspects, the invention is not necessarily limited to the specific construction selected for illustrative purposes in the accompanying drawing in which The figure is a longitudinal central section.

A stud 10 extends into a housing 12, one of these members, preferably the housing, having a tapered lathe center 14 projecting therefrom and the other member having a projecting shank 16 for supporting it on a tailstock or headstock. An antifriction bearing having two rows of rolling elements 18, herein shown as balls, is mounted between the stud and the housing, the inner race ring 20 having a push or tapping fit on the stud for accurate sliding thereon and the outer race ring 22 preferably having a drive fit in the housing.

The inner race ring abuts at one end against a stiff spring preferably consisting of a pair of dished plates or washers 24 which engage one another at their outer peripheries and loosely surround the stud at their inner peripheries.

One of the dished spring plates abuts against a shoulder 26 where the stud joins the shank. The inner race ring 20 projects a little beyond the stud 10 where it is engaged by a stop member, preferably an adjusting nut 28 screwed on a threaded projection 30 of the stud. The nut is locked in position by a radial projection 31 from an arcuate spring 32 supported in a groove of the nut. The outer race ring abuts against an annular face 34 on an end wall 36 of the housing and extends nearly to the open end of the housing. The end wall 36 is internally conical and the nut is slabbed off to allow a close approach of this wall to the stud so that the overall length of the housing can be kept down. The end wall has one or more axial openings with removable pins or plugs 38 to provide for driving the outer race ring from the housing.

The housing is closed by a ring nut 40 threaded therein and fastened in abutting relation to the outer race ring by a screw 42. The nut has an extension 44 provided with a channel for a sealing washer 46 which runs on a smooth surface 48 of the shank 16 to retain lubricant and exclude grit. The extension of the nut also forms a recess which receives and houses the spring plate 24. The antifriction bearing is shown as a double row ball bearing with one-piece race rings wherein the angular contact load lines A and B diverge towards the axis of rotation of the lathe center. The rolling elements are put under an initial predetermined compression or internal load in the direction of these load lines when the bearing is assembled so that, when external axial load is applied to the taper center 14, (as by the work-piece W and opposed taper center C) the load along the line A is not entirely removed. Consequently both rows of balls always have contact with their raceways and prevent any radial or axial looseness which could result in play or chatter of the lathe center. The divergent relation of the load lines gives a bracing effect tending to prevent cocking or tilting of the housing with respect to the stud and produces an accurate and stable support. The center 14 is conveniently ground while its housing is rotated on the bearing to insure concentricity.

The nut 28 holds the inner race ring in such an adjusted position on the stud that the spring afforded by the opposed plates 24 is under a heavy initial compression. This load is made so great that the spring device will not give when a normal working end thrust is applied to the taper center. However, should the load become greater than normal, as by excessive expansion of the work due to heating, the spring device will give and allow the bearing to shift bodily with its housing along the stud. When the excess of load is removed, the spring moves the bearing and the taper center back again until the inner race ring again forcibly engages its stop nut 28. The spring does not increase the load on the bearing elements at any time but, under severe conditions, it acts as a cushion or compensator to prevent excessive thrust load on one row of balls and so maintains the other row loaded to promote true running under all conditions.

I claim:

1. In an antifriction mounting for lathe centers, a housing, a stud extending into the housing, rolling elements, an inner race ring supported by the stud and an outer race ring supported by the housing, one of said race rings being clamped to its supporting member and the other race ring being slidably mounted with respect to its supporting member, a stop member on the last named supporting member for holding said slidably mounted race ring against movement in one direction, and a spring urging said race ring against the stop member; substantially as described.

2. In an antifriction mounting for lathe centers, a housing, a stud extending into the housing, rolling elements, an inner race ring supported by the stud and an outer race ring supported by the housing, one of said race rings being clamped to its supporting member and the other race ring being slidably mounted with respect to its supporting member, a nut engaging one end of said slidably mounted race ring, and a spring engaging the other end of said race ring and urging it against the nut; substantially as described.

3. In an antifriction mounting for lathe centers, a housing, a stud extending into the housing, rolling elements, an inner race ring supported by the stud and an outer race ring supported by the housing, one of said race rings being clamped to its supporting member and the other race ring being slidably mounted with respect to its supporting member, a nut engaging one end of the slidably mounted race ring, the supporting member having a shoulder spaced from the other end of said race ring, and a spring compressed between the shoulder and the race ring and urging the race ring against the nut; substantially as described.

4. In an antifriction mounting for lathe centers, a housing, a stud extending into the housing, rolling elements, an inner race ring supported by the stud and an outer race ring supported by the housing, one of said race rings being clamped to its supporting member and the other race ring being slidably mounted with respect to its supporting member, a nut engaging one end of the slidably mounted race ring, the supporting member having a shoulder spaced from the other end of said race ring, and a spring compressed between the shoulder and the race ring and comprising a pair of dished washers engaging one another at their outer peripheries and having their inner peripheries held by the race ring and the shoulder; substantially as described.

5. In an antifriction mounting for lathe centers, a housing, a stud extending into the housing, two rows of rolling elements, an inner race ring supported by the stud and an outer race ring supported by the housing, the race rings each having a pair of angular contact raceways engaging the rolling elements to provide opposed angular contact load lines diverging towards the axis of rotation of the lathe center, one of said race rings being clamped to its supporting member and the other race ring being slidably mounted with respect to its supporting member, a stop member engaging said slidably mounted race ring, and a spring urging said race ring against the stop member; substantially as described.

6. In an antifriction mounting for lathe centers, a housing, a stud extending into the housing, one of said members having a lathe center and the other member having a supporting shank, rolling elements, an inner race ring slidably supported by the stud and an outer race ring fixed to the housing, the race rings having raceways engaging the rolling elements and arranged to prevent relative axial shifting of said inner and outer race rings, a stop member on the stud and engaging the inner race ring, and a stiff spring urging the inner race ring against the stop member and preventing movement of the race ring due to normal end thrust against the lathe center, and said spring being yieldable upon abnormal end thrust to allow the bearing and the stud to have a relative endwise shifting; substantially as described.

7. In an antifriction mounting for lathe centers, a housing, a stud extending into the housing, one of said members having a lathe center and the other member having a supporting shank, two rows of rolling elements, an inner race ring slidably supported by the stud and an outer race ring fixed to the housing, the rolling elements being internally preloaded along opposing angular contact lines to retain the race rings against relative axial or radial shifting, a stop member on the stud and engaging the inner race ring, and a stiff spring urging said inner race ring against the stop member and preventing movement of the race ring due to normal end thrust against the lathe center, and said spring being yieldable upon abnormal end thrust to allow the housing and bearing to shift bodily endwise with respect to the stud; substantially as described.

8. In an antifriction mounting for lathe centers, a housing, a stud extending into the housing, one of said members having a lathe center and the other member having a supporting shank, rolling elements, an inner race ring supported by the stud and an outer race ring supported by the housing, one of said race rings being clamped to its supporting member and the other race ring being slidably mounted with respect to its supporting member, a stiff spring engaging and urging the slidably mounted race ring in one direction, and a stop member mounted on the last named supporting member and opposing the pressure of the spring; substantially as described.

9. In an antifriction mounting for lathe centers, a housing, a stud extending into the housing, one of said members having a lathe center and the other member having a supporting shank, rolling elements, an inner race ring supported by the stud and an outer race ring supported by the housing, one of said race rings being clamped to its supporting member and the other race ring being slidably mounted with respect to its supporting member, the race rings having raceways engaging the rolling elements and arranged to prevent relative axial shifting of said inner and outer race rings, a stop member on one of the supporting members and engaging the corresponding race ring, and a stiff spring urging said corresponding race ring against the stop member and preventing movement of the race ring due to normal end thrust against the lathe center, and said spring being yieldable upon abnormal end thrust to allow the bearing and one of the race ring supporting members to have a relative endwise shifting; substantially as described.

In testimony whereof I hereunto affix my signature.

JOHN H. BANINGER.